(12) United States Patent
Crean et al.

(10) Patent No.: US 8,203,760 B2
(45) Date of Patent: Jun. 19, 2012

(54) VECTOR HALFTONING IN AN IMAGE PATH UTILIZING SUB-SAMPLED CROSS-CHANNEL IMAGE VALUES

(75) Inventors: Peter A. Crean, Webster, NY (US); Robert P. Loce, Webster, NY (US); Edgar Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 713 days.

(21) Appl. No.: 12/396,668

(22) Filed: Mar. 3, 2009

(65) Prior Publication Data

US 2010/0225972 A1    Sep. 9, 2010

(51) Int. Cl.
*H04N 1/405* (2006.01)
*H04N 1/46* (2006.01)
(52) U.S. Cl. ...................... 358/3.06; 358/515
(58) Field of Classification Search .............. 358/3.06, 358/1.9, 3.07, 1.13, 1.3, 515, 2.99; 715/275, 715/276; 399/27, 28, 58
See application file for complete search history.

(56) References Cited

U.S. PATENT DOCUMENTS

| 5,631,748 | A | 5/1997 | Harrington |
| 6,501,567 | B2 | 12/2002 | Sharma et al. |
| 6,844,941 | B1 | 1/2005 | Sharma et al. |
| 7,068,391 | B2 * | 6/2006 | Dewitte et al. ............. 358/1.9 |
| 7,095,530 | B2 | 8/2006 | Mantell et al. |
| 7,136,189 | B2 | 11/2006 | Sharma et al. |
| 7,747,951 | B2 * | 6/2010 | Croft ............................ 715/276 |
| 7,973,966 | B2 * | 7/2011 | Silverbrook et al. .......... 358/1.3 |
| 2006/0268294 | A1 | 11/2006 | Snyder et al. |
| 2006/0268295 | A1 | 11/2006 | Yao et al. |
| 2008/0062441 | A1 | 3/2008 | Nagarajan et al. |
| 2009/0161136 | A1 * | 6/2009 | Li et al. ....................... 358/1.13 |

OTHER PUBLICATIONS

U.S. Appl. No. 12/258,871, filed Oct. 27, 2008, Crean et al.

* cited by examiner

*Primary Examiner* — Charlotte M Baker
(74) *Attorney, Agent, or Firm* — Fay Sharpe LLP

(57) ABSTRACT

This disclosure provides methods, apparatus and systems to generate vector halftone data for rendering an image on an image output device. According to one aspect, a method generates vector halftone data as a function of contone pixel data for a given colorant at its nominal resolution and contone pixel data for the other colorants at a relatively lower resolution.

23 Claims, 8 Drawing Sheets

| 184 | 11 | 224 | 51 | 252 | 17 | 114 | 241 | 128 | 79 | 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | 2 | 142 | 96 | 220 | 73 | 119 | 55 | 162 | 13 | 254 | 141 | 208 |
| 8 | 187 | 244 | 81 | 183 | 238 | 29 | 171 | 12 | 246 | 35 | 205 | 126 | 43 | 177 | 61 |
| 145 | 101 | 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | 9 | 151 | 212 | 16 | 194 |
| 82 | 122 | 178 | 132 | 74 | 172 | 253 | 5 | 165 | 42 | 240 | 199 | 98 | 50 | 130 | 159 |
| 30 | 251 | 3 | 202 | 106 | 18 | 143 | 113 | 197 | 138 | 78 | 33 | 175 | 247 | 65 | 222 |
| 169 | 88 | 152 | 46 | 237 | 189 | 67 | 219 | 25 | 105 | 214 | 156 | 121 | 4 | 186 | 109 |
| 203 | 53 | 221 | 124 | 77 | 158 | 39 | 95 | 168 | 245 | 14 | 68 | 233 | 93 | 148 | 20 |
| 97 | 136 | 15 | 176 | 34 | 213 | 135 | 234 | 45 | 87 | 146 | 193 | 37 | 207 | 48 | 243 |
| 60 | 232 | 192 | 94 | 250 | 108 | 0 | 190 | 125 | 206 | 58 | 112 | 164 | 83 | 131 | 179 |
| 1 | 157 | 72 | 26 | 153 | 54 | 166 | 75 | 21 | 161 | 226 | 10 | 255 | 24 | 223 | 117 |
| 91 | 211 | 127 | 235 | 118 | 200 | 227 | 100 | 248 | 47 | 134 | 182 | 99 | 149 | 56 | 195 |
| 249 | 62 | 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | 6 | 218 | 167 | 242 | 120 | 7 | 231 | 129 |

*FIG. 7*

```
HALFTONE USING:
IF B > t,  C AND M DOTS ARE ON
ELSE IF B+Mout > t,  M DOT IS ON
ELSE IF B+Mout+Cout > t,
   C DOT IS ON
IF Y > t',  Y DOT IS ON
```
*121'*

FIG. 8

VECTOR HALFTONING IN AN IMAGE PATH UTILIZING SUB-SAMPLED CROSS-CHANNEL IMAGE VALUES

CROSS REFERENCE TO RELATED PATENTS AND APPLICATIONS

U.S. patent application Ser. No. 12/258,871, filed Oct. 27, 2008, entitled "IMAGE PATH UTILIZING SUB-SAMPLED CROSS-CHANNEL IMAGE VALUES," by Crean et al. is incorporated herein by reference in its entirety.

BACKGROUND

The present disclosure relates to printing from digital images and particularly color printing. Color printing is typically accomplished by deposition of multiple colorants as for example, by printers utilizing cyan, magenta yellow and black colorants, where each colorant is represented in a channel of the digital image.

Vector halftoning is well suited for ink jet marking because the tight color-to-color registration capabilities can be used by the halftoning method to produce finer textures and a better gamut by utilizing correlation between the halftoned color planes. The method preferentially creates dot-off-dot halftone planes, which leads to those known image quality benefits. Vector halftoning requires knowledge of the values within multiple color separations to decide on marking decision in each separation. This is not an issue for many ink jet printers because jets for the various colorants are in close proximity so image data being printed for any one channel is close to image data being printed for another channel. The proximity allows for relatively low cost memory buffers.

Vector halftoning in an image path that has imaging stations for the different colorant planes at a significant separation, however, is expensive due to the need to provide large page buffers to align the data for the color planes because the different colorant values (CMYK . . . ) for a given pixel can be printed at significantly different times. In terms of memory capacity and system architecture, such processing is prohibitively expensive and otherwise impractical.

Vector halftoning could be performed in a Digital Front End (DFE) that provides the digital image to the printer. Typically, a DFE rasterizes the image from some page description language form and holds all color planes in memory simultaneously. Halftoning in the DFE avoids the cost associated with large amounts of high speed memory in the printer, which would be needed if the imaging stations are at a significant distance. However, the approach of halftoning in the DFE results in a serious limitation in the ability to maintain the calibration of a print engine. To maintain the calibration of a printer, it is desirable to apply adjustments to the digital values in the color channels to track the physical marking characteristics of a print engine as it varies in time. Continuous tone pixel values, such as 8 bit (0 to 255) values can be adjusted to maintain the calibration of the overall printing process. After halftoning is performed, pixel values within the channels are typically binary (0,1), and minor adjustment of a pixel level is very difficult to perform.

Co-pending patent application Ser. No. 12/258,871, filed Oct. 27, 2008, entitled "Image Path Utilizing Sub-Sampled Cross-Channel Image Values," by Crean et al., describes an image path architecture for performing cost-effective cross-channel image processing. For generating the output value of a given colorant (e.g., cyan), the method utilizes pixel data for that colorant at its nominal (full) resolution, while pixel data for other colorants is utilized at a lowered resolution. For instance, color-corrected pixel values for cyan can be obtained by inputting cyan pixel values at nominal resolution into a multi-dimensional LUT, and the values for the other color dimensions are input using sub-sampled values, such as JPEG DC coefficients or DRI pixel values (Display Resolution Image). Using the nominal (full) resolutions for cross-channel processing would require a 300% increase in bandwidth for each output color, while the aforementioned disclosure utilizes JPEG DC coefficients requiring only a 4% increase. Similar gains are obtained in image buffering.

The disclosed embodiments, which relate to vector halftoning in an image path utilizing sub-sampled cross-channel image values, have the potential to provide even greater savings in image paths utilizing more than 4 colorants.

INCORPORATION BY REFERENCE

The following patents and patent publications are totally incorporated herein by reference in their entirety.

U.S. Patent Application Publication No. 2006/0268294, published Nov. 30, 2006, entitled "COLOR PRINTING," by Snyder et al.

U.S. Patent Application Publication No. 2006/0268295, published Nov. 30, 2006, entitled "COLOR PRINTING," by Yao et al.

U.S. Patent Application Publication No. 2008/0062441, published Mar. 13, 2008, entitled "DYNAMIC ADJUSTMENT OF RASTER IMAGE PROCESSING PERFORMANCE BASED ON COLORS SEEN WITHIN SEVERAL RUNS," by Nagarajan et al.

U.S. Pat. No. 6,844,941, issued Jan. 18, 2005, entitled "COLOR HALFTONING USING A SINGLE SUCCESSIVE-FILLING HALFTONE SCREEN," by Sharma et al.

U.S. Pat. No. 6,501,567, issued Dec. 31, 2002, entitled "METHOD AND SYSTEM FOR DESIGNING SPATIALLY-PARTITIONED AND CORRELATED STOCHASTIC SCREENS FOR COLOR HALFTONING," by Sharma et al.

U.S. Pat. No. 7,136,189, issued Nov. 14, 2006, entitled "COLOR HALFTONING USING A MULTI-LEVEL SUCCESSIVE-FILLING HALFTONE SCREENING ALGORITHM," by Sharma et al.

U.S. Pat. No. 7,095,530, issued Aug. 22, 2006, entitled "COLOR VECTOR HALFTONING USING A SUCCESSIVE FILLING WITH IMPROVED COLOR REGISTRATION LATITUDE," by Mantell et al.

U.S. Pat. No. 5,631,748, issued May 20, 1997, entitled "COLOR IMAGES HAVING MULTIPLE SEPARATIONS WITH MINIMALLY OVERLAPPING HALFTONE DOTS AND REDUCED INTERPIXEL CONTRAST," by Steven J. Harrington.

BRIEF DESCRIPTION

In accordance with the present embodiment, a method is provided for generating a halftone data representation of an image for rendering on a multicolor image output device. The method comprises generating a first contone pixel data representation of the image for a first color separation associated with the image output device and generating a second contone pixel data representation of the image for a second color separation associated with the image output device; generating a halftone data representation of the image for the first color separation as a function of the first contone pixel data representation at a first resolution and the second contone pixel data representation at a second resolution less than the first resolution; generating a halftone data representation of the image for the second color separation; and rendering the image on the multicolor image output device using the halftone data representation of the image for the first color separation and the halftone data representation of the image for the second color separation.

In accordance with another embodiment, a computer program product is provided comprising a computer-usable data carrier storing instructions that, when executed by a computer, cause the computer to perform a method of generating a halftone data representation of an image for rendering on a multicolor image output device. The method comprises generating a first contone pixel data representation of the image for a first color separation associated with the image output device; generating a second contone pixel data representation of the image for a second color separation associated with the image output device; generating a halftone data representation of the image for the first color separation as a function of the first contone pixel data representation at a first resolution and the second contone pixel data representation at a second resolution less than the first resolution; generating a halftone data representation of the image for the second color separation; and rendering the image on the multicolor image output device using the halftone data representation of the image for the first color separation and the halftone data representation of the image for the second color separation.

In accordance with yet another embodiment, a printing apparatus is provided comprising an image marking device including a plurality of colorants for marking an image on a media substrate, and an image processing device, the image processing device configured to perform a method of generating a halftone data representation of an image for marking on the image marking device. The method comprises generating a first contone pixel data representation of the image for a first color separation associated with the image marking device; generating a second contone pixel data representation of the image for a second color separation associated with the image output device; generating a halftone data representation of the image for the first color separation as a function of the first contone pixel data representation at a first resolution and the second contone pixel data representation at a second resolution less than the first resolution; generating a halftone data representation of the image for the second color separation; and rendering the image on the multicolor image output device using the halftone data representation of the image for the first color separation and the halftone data representation of the image for the second color separation.

BRIEF DESCRIPTION OF THE DRAWINGS

FIG. 7 is a schematic diagram of an embodiment of a stochastic threshold value array.

FIG. 8 is a schematic flow diagram of an embodiment of an alternative step that can be employed in the procedure of FIG. 6.

DETAILED DESCRIPTION

Figure 1:
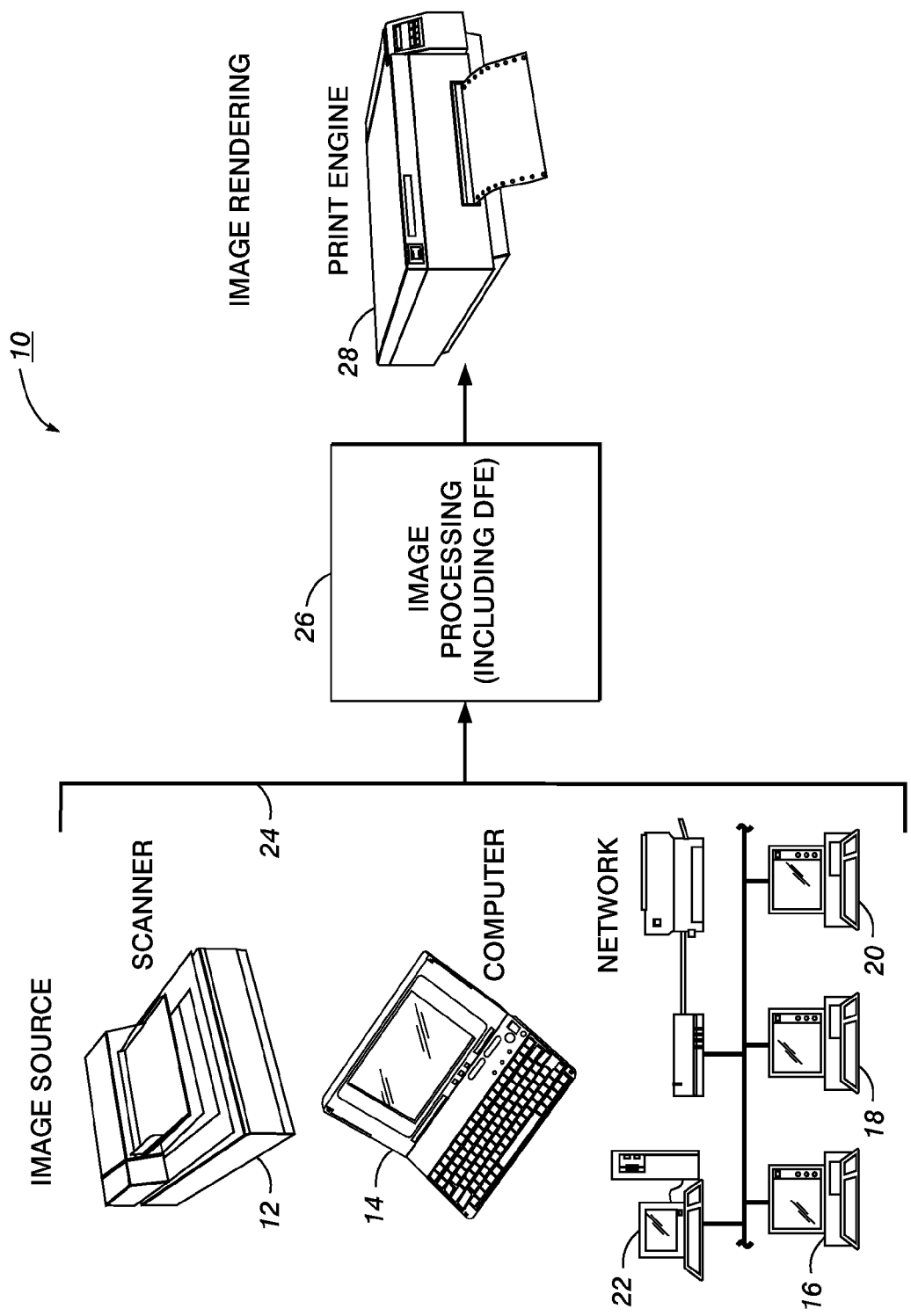
FIG. 1 is a pictorial schematic of a digital printing system according to an exemplary embodiment of this disclosure.

The present disclosure provides a vector halftoning method and system that utilizes pixel data for a given colorant at its nominal (full) resolution, while pixel data for other colorants are utilized at a lowered resolution. For instance, halftoned pixel values for cyan can be obtained by inputting cyan pixel values at nominal resolution into a vector halftoner, and the values for the other color separations are input using sub-sampled values, such as JPEG DC coefficients or DRI pixel values (Display Resolution Image). A schematic of an exemplary embodiment of the present disclosure is shown in FIG. 1.

The sub-sampling rate need not be the same for all channels. For example, the human visual system has low acuity for yellow, so the Y channel could possibly be sampled at a lower resolution than the other channels without incurring a significant loss in image quality. Not all channels need to be passed to each vector halftoning module. The channels required by each module are dependent upon the specific vector halftoning method that is employed. The sub-sampling could be performed as simple averaging, weighted averaging, decimation or other known sub-sampling method.

Within the vector halftoning module, the low resolution image data is aligned with the nominal resolution data so pixel-resolution vector halftoning can be applied. In effect, the low resolution data is "up-sampled" temporarily within the vector halftoning module. The "up-sampling" could take on a variety of forms, such as using the same low resolution value repeatedly for a group of co-located nominal resolution pixels, or interpolating between neighboring low resolution samples to generate intermediate nominal resolution samples.

The present disclosure applies to halftoning methods that use cross-channel information to make decisions on dot (marked pixel) placement. The term "vector halftoning" is used to describe these methods, but different terminology may be used by other practitioners. The exemplary embodiments described herein incorporate a simple halftoning method as described in Yao and Synder (see U.S. Patent Application Publication No. 2006/0268294, published Nov. 30, 2006, entitled "COLOR PRINTING". However, other vector halftoning methods may be used and are within the scope of this disclosure. For example, U.S. Patent Application Publication No. 2006/0268295, published Nov. 30, 2006, entitled "COLOR PRINTING"), the successive fill methods of Sharma et al. and Mantell et al. (see U.S. Pat. No. 6,844,941, issued Jan. 18, 2005, entitled "COLOR HALFTONING USING A SINGLE SUCCESSIVE-FILLING HALFTONE SCREEN;" U.S. Pat. No. 6,501,567, issued Dec. 31, 2002, entitled "METHOD AND SYSTEM FOR DESIGNING SPATIALLY-PARTITIONED AND CORRELATED STOCHASTIC SCREENS FOR COLOR HALFTONING"; U.S. Pat. No. 7,136,189, issued Nov. 14, 2006, entitled "COLOR HALFTONING USING A MULTI-LEVEL SUCCESSIVE-FILLING HALFTONE SCREENING ALGORITHM"; and U.S. Pat. No. 7,095,530, issued Aug. 22, 2006, entitled "COLOR VECTOR HALFTONING USING A SUCCESSIVE FILLING WITH IMPROVED COLOR REGISTRATION LATITUDE"), the minimal overlap method of Harrington (see U.S. Pat. No. 5,631,748, issued May 20, 1997, entitled "COLOR IMAGES HAVING MULTIPLE SEPA- RATIONS WITH MINIMALLY OVERLAPPING HALFTONE DOTS AND REDUCED INTERPIXEL CONTRAST").

Figure 3:
FIG. 3 is a magnified rendering of an image using independent channel (scaler) halftoning.
Figure 4:
FIG. 4 is a magnified rendering of the same image rendered in FIG. 3, where the image is rendered using vector halftoning according to an exemplary embodiment of this disclosure.

The images of FIGS. 3 and 4 re intended to show the benefit of a vector halftoning method compared to an independent channel (scalar) halftoning method. The image in FIG. 3 was halftoned in a channel-independent manner, which resulted in more dot-on-dot pixels than what occurs in the image in FIG. 4, which was halftoned using vector processing. The dot-on-dot structure makes the texture appear grainier and reduces the size of the printer's color gamut compared to the dot-off-dot structures that are produced with the vector method.

Referring to FIG. 1, a digital printing system is indicated generally. This is an example of a network and printing system 10, and includes a scanner 12, an optional computer terminal 14, and a network comprising terminals 16, 18, 20 connected with other components such as a mainframe computer 22 all of which are operatively connected through a network 24 to an image processor which may include the digital front end (DFE) indicated by reference numeral 26 which provides a digital image output to a print engine 28. The DFE has memory and a processor for storing and executing instructions for providing the described functionality, for example multichannel sub-sampling.

Figure 2:
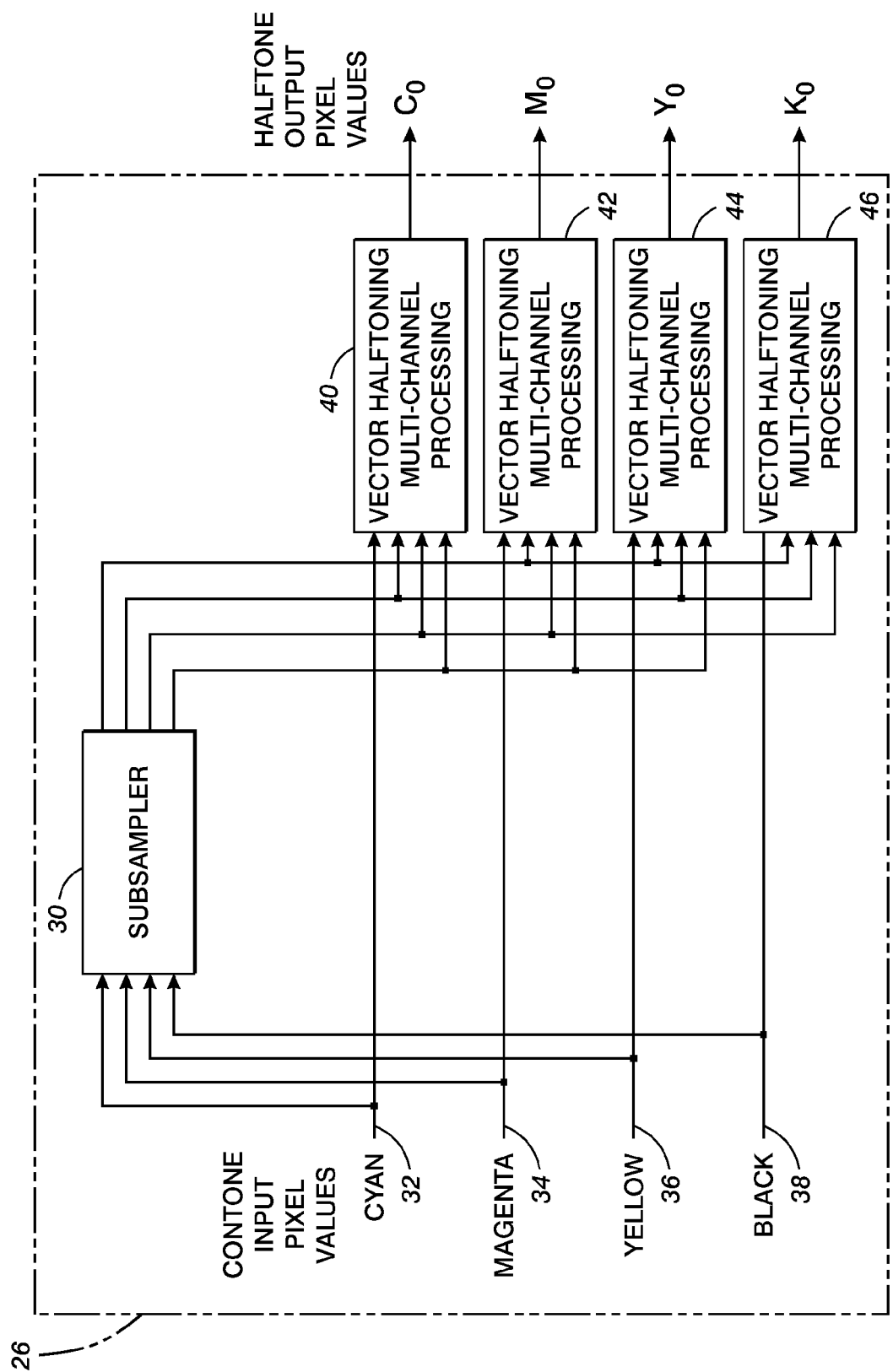
FIG. 2 is a flow diagram of an exemplary process for generating a halftone data representation of an image according to an exemplary embodiment of this disclosure.

Referring to FIG. 2, the operations of the image processor 26 are shown pictorially wherein the contone input pixel values for the individual colorants such as cyan (C), magenta (M), yellow (Y) and black (K) are inputted respectively along lines 32, 34, 36, 38 simultaneously to the sub-sampler 30 and individually to a multi-channel processing units denoted respectively 40, 42, 44, 46. Notably, according to this disclosure, the multi-channel processing unit/units apply vector halftoning processes to the input contone pixel values. To obtain the color separation output values for a given pixel the sub-sampler is operative to provide a sub-sample of the full resolution pixel value data about that pixel for each colorant respectively and inputs the sub-samples respectively to the multi-channel processors for each of the other colorants employed. The multi-channel processors 40, 42, 44, 46 are operative to combine the full resolution pixel value respectively for the selected colorant inputted directly thereto along with the sub-sampled low resolution pixel value data for the other colorants to provide a respective halftone output pixel value indicated respectively as $C_o$, $M_o$, $Y_o$ and $K_o$ in FIG. 2.

The low resolution sub-sample about a given pixel is obtained for each colorant by calculating averages of N×N windows in the image and it has been found satisfactorily to use N=8, but it will be understood that other values can be employed depending upon the application, and the window need not be symmetric in size. The low resolution sub-sample about a given pixel may also be obtained by regular sub-sampling picking one pixel value out of the set of N×N pixels in the window, which is also known as decimation. Alternatively, averaging with weighted values prior to sampling may be employed to derive the sub-samples from the color separations. Other order-statistic methods may be used to derive the sub-samples, such as using the maximum value, median value, or minimum value within the N×N window as the sub-sample value. Another alternative is to use the value derived as a result of other operations such as JPEG compression which calculates the DC value of every 8×8 pixel window. Considering, for example, a sub-sampling process that utilizes averaging, if the printing engine is processing the cyan value C at full resolution, it will have averages for M, K and Y across the corresponding N×N window in which the cyan pixel is located. Thus, if the full resolution pixel C has a spatial location in row n and column m of the image, when a factor N=8 is being used for sub-sampling, the print engine will have available the spatially averaged M value of the block going from row $8\times\lceil n/8\rceil-7$ to row $8\times\lceil n/8\rceil$ and from column $8\times\lceil m/8\rceil-7$ to column $8\times\lceil m/8\rceil$, and correspondingly for the averages of the K and Y sub-sample pixel values.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 5:
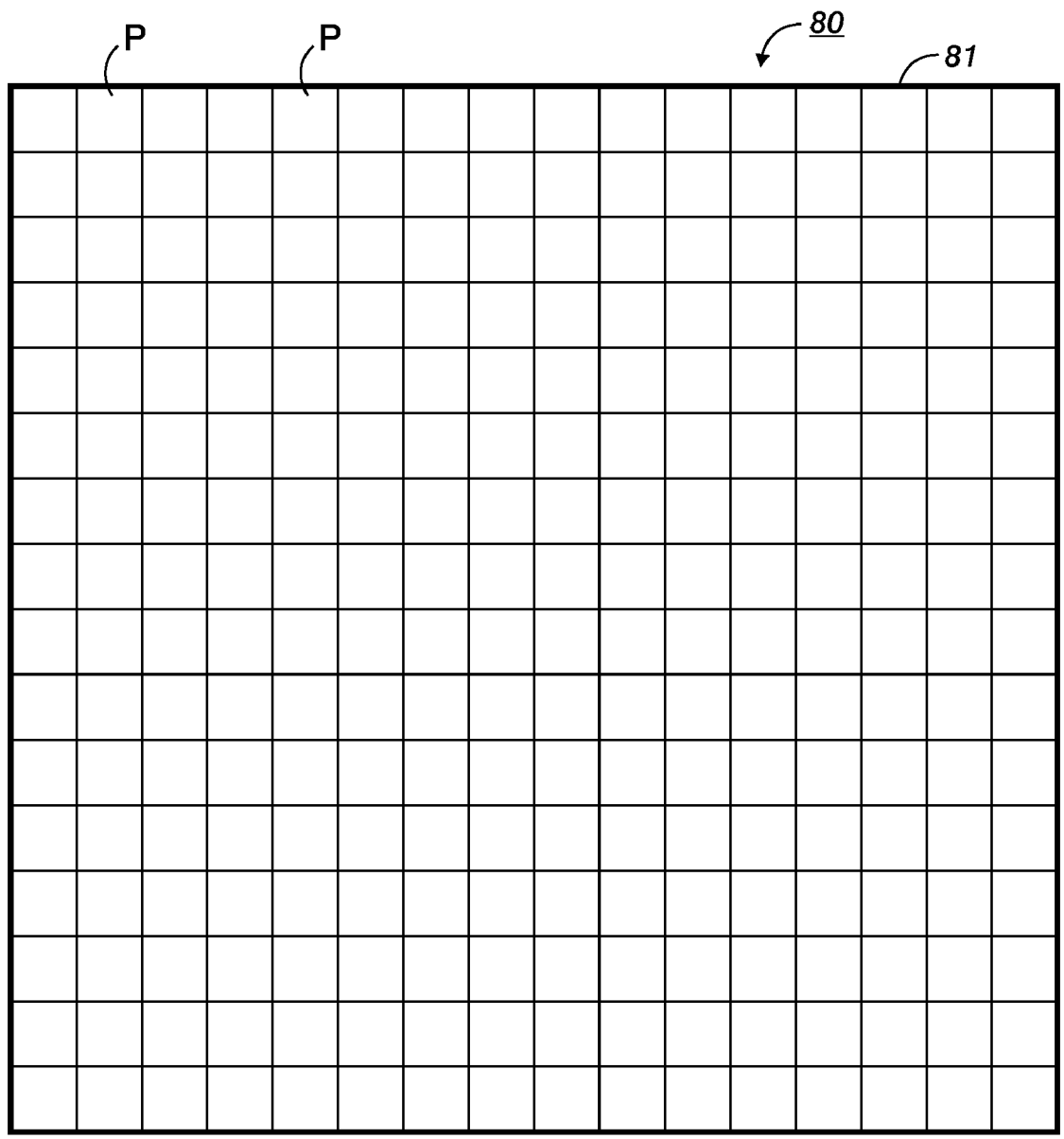
FIG. 5 is a schematic illustration of an embodiment of a pixel array.

FIG. 5 is a schematic illustration of an embodiment of an array 80 of pixel locations P that can be used to define the locations on a print output medium 81 that can be marked or printed. A marking of a particular primary colorant (e.g., cyan, magenta, yellow or black) that is printed or deposited at a pixel location can be conveniently called a dot.

Each pixel location P can, for example, be marked or printed with (a) one or more non-black primary colorant dots (e.g., cyan, magenta or yellow), (b) a black dot by itself, or (c) a black dot and at least one non-black primary colorant dot.

Print data typically comprises continuous tone data (such as 32-bit or 24-bit pixel data for the collective colorant separations), and halftoning (e.g., using one or more halftone threshold arrays) is commonly employed to map or transform continuous tone data to a halftoned bit map that contains one bit per pixel per primary colorant plane, for example.

Figure 6:
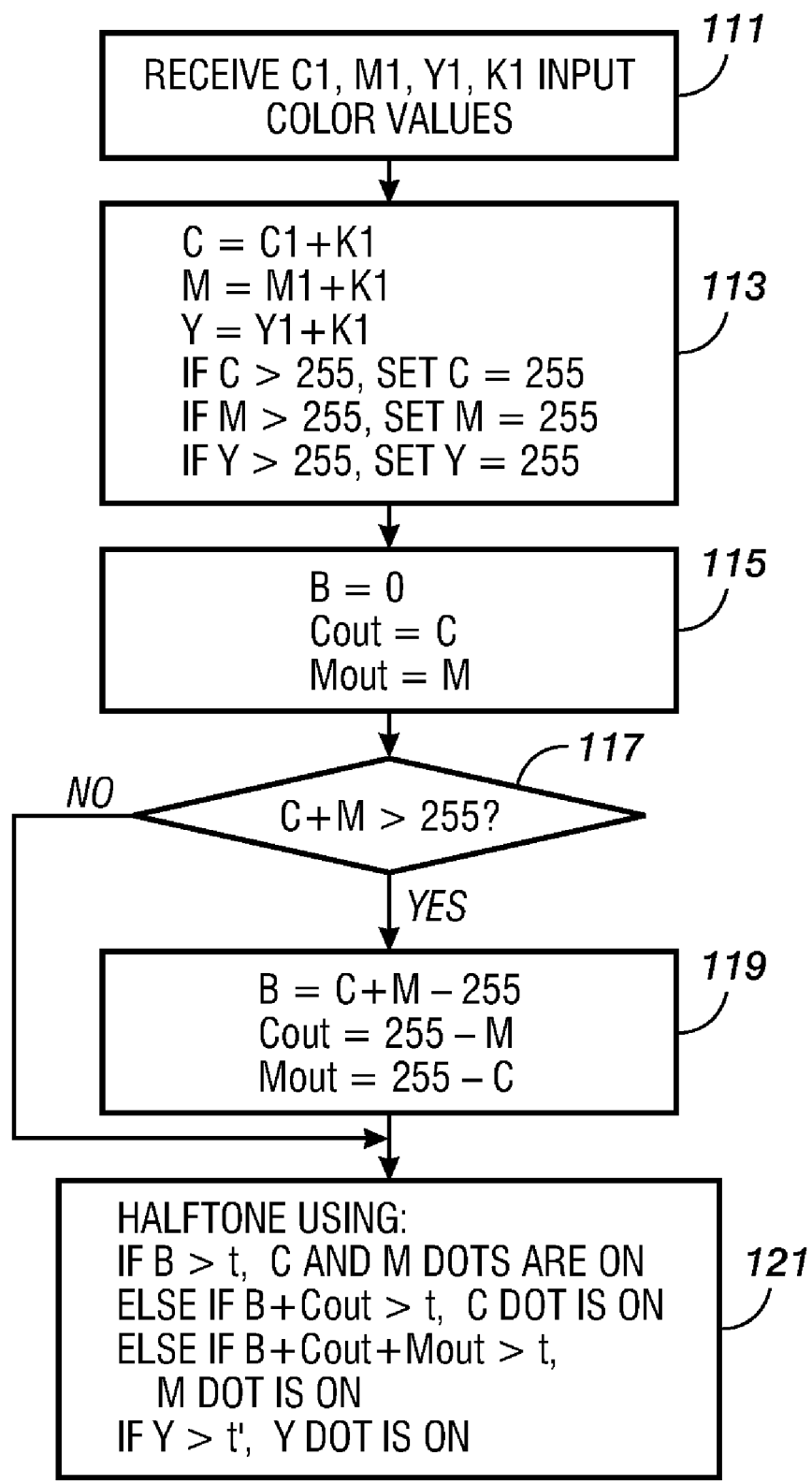
FIG. 6 is a schematic flow diagram of an embodiment of a procedure for printing a pixel of print data.

FIG. 6 is a schematic flow diagram of an embodiment of a vector halftoning procedure for printing a pixel of CMYK print data. At 111 cyan, magenta, yellow, and black input color values $C_1$, $M_1$, $Y_1$, $K_1$ are received. At 113 the input color values $C_1$, $M_1$, $Y_1$, $K_1$ are transformed to cyan, magenta, and yellow color values C, M, Y, for example in such a manner that each of C, M, Y is not greater than a predetermined maximum color value such as 255 (for example for 8-bit color values):

$$C=C_1+K_1$$

$$M=M_1+K_1$$

$$Y=Y_1+K_1$$

If C>255, set C=255
If M>255, set M=255
If Y>255, set Y=255

At 115, a blue colorant value B for overlapping cyan and magenta is initialized to zero (0), and the cyan and magenta output colorant values $C_{out}$, $M_{out}$ are initialized to the cyan and magenta values C, M:

$$B=0$$

$$C_{out}=C$$

$$M_{out}=M$$

At 117, a determination is made as to whether C+M is greater than 255. If no, processing continues at 121.

If the determination at 117 is yes, at 119 values for B, $C_{out}$, and $M_{out}$ are calculated, for example such that $B+C_{out}+M_{out}=255$:

$$B=C+M-255$$

$$C_{out}=255-M$$

$$M_{out}=255-C$$

The equation $B+C_{out}+M_{out}=255$ is based on having no white space since $C+M>255$. The Equation $B=C+M-255$ identifies the overlapping cyan and magenta dots as being the amount of $C+M$ that exceeds 255. The foregoing exemplary expressions for $C_{out}$ and $M_{out}$ also satisfy the equations $C=B+C_{out}$ and $M=B+M_{out}$, which can provide for printing of the total number of cyan and magenta dots requested by the CMYK color data.

At 121 halftoning is performed using the following, for example using a stochastic halftone threshold array A1 having a threshold value t for each pixel scaled to [0, 255] for blue, cyan and magenta, and a stochastic halftone threshold array A2 having a threshold value t' for each pixel scaled to [0, 255], for the illustrative example wherein the predetermined maximum color value is 255.

| | |
|---|---|
| If $B>t$, | cyan, magenta dots are on |
| Else if $B+C_{out}>t$, | cyan dot is on |
| Else if $B+C_{out}+M_{out}>t$, | magenta dot is on |
| If $Y>t'$, | yellow dot is on |

FIG. 7 schematically illustrates an embodiment of a stochastic halftone threshold array that can be employed as either or both of the threshold arrays A1, A2.

The threshold arrays A1, A2 can be correlated or uncorrelated. By way of illustrative example, the threshold array A2 can be derived by shifting the threshold array A1 by a predetermined number of pixels, whereby the threshold array A2 is a replica of the threshold array A1 that is shifted relative to the threshold array A1 by a predetermined number of pixels. Where A2 is a shifted version of A1, the correlation between A2 and A1 decreases as the shift increases.

FIG. 8 sets forth an embodiment of an alternative halftoning step 221' that can be substituted 221 in the procedure of FIG. 6:

| | |
|---|---|
| If $B>t$, | cyan, magenta dots are on |
| Else if $B+M_{out}>t$, | magenta dot is on |
| Else if $B+M_{out}+C_{out}>t$, | cyan dot is on |
| If $Y>t'$, | yellow dot is on |

Such halftoning can be performed, for example, using a stochastic halftone threshold array A1 having a threshold value t for each pixel scaled to [0, 255] for blue, cyan and magenta, and a stochastic halftone threshold array A2 having a threshold value t' for each pixel scaled to [0, 255] for yellow, for the illustrative example wherein the predetermined maximum color value is 255. FIG. 7 schematically illustrates an embodiment of a stochastic halftone threshold array that can be employed as either or both of the threshold arrays A1, A2.

It should be appreciated that the foregoing generally contemplates processing CMY print data, where such data can be transformed from CMYK data. To the extent that the input print data comprises CMY print data, $K_1$ can be omitted from the equations at 113 where the input color values $C_1, M_1, Y_1$ are transformed to cyan, magenta, and yellow color values C, M, Y, for example in such a manner that each of C, M, Y is not greater than a predetermined maximum color value such as 255 (for example for 8-bit color values).

Pursuant to the disclosed procedures for processing color values, cyan and magenta dots are substantially uniformly distributed, and overlapping cyan and magenta dots are reduced.

In the halftoning step 219', the threshold arrays A1, A2 can be correlated or uncorrelated. By way of illustrative example, the threshold array A2 can be derived by shifting the threshold array A1 by a predetermined number of pixels, whereby the threshold array A2 is a replica of the threshold array A1 that is shifted relative to the threshold array A1 by a predetermined number of pixels. Where A2 is a shifted version of A1, the correlation between A2 and A1 decreases as the shift increases.

The sub-sampling module 30 may utilize a simple averaging over the sub-sample area or other sub-sampling methods such as decimation, weighted averaging and non linear maximum, minimum and median sub-sampling may be used. If weighted averaging is used within a common sub-sampler, a common memory buffer for the weights that are applied to all the channels may be employed. An alternative arrangement would permit the sub-sampler to be adaptive such that different sub-sampling rates are used for the image data with different levels of complexity. In addition to sub-sampling, additional compression can be applied to the low resolution channels thereby further reducing the band width required of the cross panel process.

Alternatively, the sub-sample value can be derived as a result of other operations such as JPEG compression which calculates the DC value of every 8×8 pixel window. Thus, if the printing engine is processing the cyan value C at full resolution, it will have averages for M and Y across the corresponding N×N window in which the cyan pixel is located. Thus, if the full resolution pixel C has a spatial location in row n and column m of the image, when a factor N=8 is being used for sub-sampling, the print engine will have available the spatially averaged M value of the block going from row $8 \times \lceil n/8 \rceil - 7$ to row $8 \times \lceil n/8 \rceil$ and from column $8 \times \lceil m/8 \rceil - 7$ to column $8 \times \lceil m/8 \rceil$, and correspondingly for the averages of the K and Y sub-sample pixel values.

Another alternative is to employ JPEG2000, which is a common image compression format, as a source of sub-sampled image data. JPEG2000 transforms the image into a set of two dimensional sub-band signals, each representing the activity of the image in various frequency bands at various spatial resolutions. Each successive decomposition level of the sub-bands has approximately half the horizontal and half the vertical resolution of the previous level. A reverse decomposition module within the sub-sampler reverses as many decomposition steps as necessary to obtain a low resolution version of the original image with resolution equal to the desired sub-sample spatial resolution utilized in the multi-dimensional mappings.

Yet another alternative is to use a sampler whose output is designed to produce a display resolution image, or a "thumbnail" view of the image.

In the present practice, it has been found satisfactory to employ a sub-sample of 1 out of 64 for an 8×8 pixel cell and 1 out of 256 for a 16×16 pixel cell for the colorants other than the selected colorant for full resolution.

The teachings herein have described an image path utilizing sub-sampled cross-channel image values using cyan, magenta, yellow and black as exemplary colorants. However, it has been found satisfactory for use with other colorants and colorant combinations, and particularly for printing systems employing more than four colorants. For example, some combination of gray, light cyan, light magenta, and dark yellow colorants, along with CMYK are used in certain printer to achieve a smoother appearance in image highlights. Orange, green and violet colorants are used in some printing systems for purposes of extending the gamut of achievable colors of the printer. Other examples of colorants that may be employed are red, blue, clear, and white. Other printing systems may use fewer colorants, such as a highlight color printer that prints black and one color.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of generating a halftone data representation of an image for rendering on a multicolor image output device comprising:
   (a) generating a first contone pixel data representation of the image for a first color separation associated with the image output device;
   (b) generating a second contone pixel data representation of the image for a second color separation associated with the image output device;
   (c) generating a halftone data representation of the image for the first color separation as a function of the first contone pixel data representation at a first resolution and the second contone pixel data representation at a second resolution less than the first resolution;
   (d) generating a halftone data representation of the image for the second color separation; and
   (e) rendering the image on the multicolor image output device using the halftone data representation of the image for the first color separation and the half-tone data representation of the image for the second color separation.

2. The method according to claim 1, wherein step (d) comprises:
   generating a halftone data representation of the image for the second color separation as a function of the first contone pixel data representation and the second contone pixel data representation.

3. The method according to claim 2, wherein step (d) comprises:
   generating the halftone data representation of the image for the second color separation as a function of the first contone pixel data representation at a third resolution and the second contone pixel data representation at a fourth resolution greater than the third resolution.

4. The method according to claim 3, further comprising:
   generating one or more additional contone pixel data representations of the image for one or more, respective, additional color separations associated with the image output device;
   generating one or more halftone data representations of the image for the respective one or more additional color separations; and
   rendering the image on the multicolor image output device using the halftone data representation of the image for the first color separation, the halftone data representation of the image for the second color separation, and the halftone data representation of the image for the one or more additional color separations.

5. The method according to claim 4, wherein the one or more halftone data representations of the respective one or more additional color separations are generated as a function of one or more of the other color separations represented in contone at a reduced resolution relative to the contone resolution of the respective additional color separation.

6. The method according to claim 1, wherein step (a) generates the first contone pixel data representation at a first nominal resolution, step (b) generates the second contone pixel data representation at a second nominal resolution, and step (c) generates the halftone data representation of the image for the first color separation as a function of the first contone pixel data representation at the first nominal resolution and the second contone pixel data representation at a resolution less than the second nominal resolution.

7. The method according to claim 6, wherein the first and second nominal resolutions are equivalent.

8. The method according to claim 1, wherein the second contone pixel data representation at a resolution less than the second nominal resolution is generated by sub-sampling the second contone pixel data representation at the second nominal resolution.

9. The method according to claim 8, wherein the sub-sampling includes one of (a) simple averaging over a sub-sample area, (b) weighted averaging over a sub-sampled area, (c) determining the median of pixel values in a sub-sampled area, (d) determining the minimum of pixel values in a sub-sampled area, (e) determining the maximum of pixel values in a sub-sampled area, and (f) decimation.

10. A computer program product comprising:
    a non-transitory computer-usable data carrier storing instructions that, when executed by a computer, cause the computer to perform a method of generating a halftone data representation of an image for rendering on a multicolor image output device, the method comprising:
    (a) generating a first contone pixel data representation of the image for a first color separation associated with the image output device;
    (b) generating a second contone pixel data representation of the image for a second color separation associated with the image output device;
    (c) generating a halftone data representation of the image for the first color separation as a function of the first contone pixel data representation at a first resolution and the second contone pixel data representation at a second resolution less than the first resolution;
    (d) generating a halftone data representation of the image for the second color separation; and
    (e) rendering the image on the multicolor image output device using the halftone data representation of the image for the first color separation and the halftone data representation of the image for the second color separation.

11. The computer program product according to claim 10, wherein step (d) comprises:
    generating a halftone data representation of the image for the second color separation as a function of the first contone pixel data representation and the second contone pixel data representation.

12. The computer program product according to claim 11, wherein step (d) comprises:
    generating the halftone data representation of the image for the second color separation as a function of the first contone pixel data representation at a third resolution and the second contone pixel data representation at a fourth resolution greater than the third resolution.

13. The computer program product according to claim 12, wherein the method comprises:
    generating one or more additional contone pixel data representations of the image for one or more, respective, additional color separations associated with the image output device;

generating one or more halftone data representations of the image for the respective one or more additional color separations; and rendering the image on the multicolor image output device using the halftone data representation of the image for the first color separation, the halftone data representation of the image for the second color separation, and the halftone data representation of the image for the one or more additional color separations.

14. The computer program product according to claim 13, wherein the one or more halftone data representations of the respective one or more additional color separations are generated as a function of one or more of the other color separations represented in contone at a reduced resolution relative to the contone resolution of the respective additional color separation.

15. The computer program product according to claim 13, wherein step (a) generates the first contone pixel data representation at a first nominal resolution, step (b) generates the second contone pixel data representation at a second nominal resolution, and step (c) generates the halftone data representation of the image for the first color separation as a function of the first contone pixel data representation at the first nominal resolution and the second contone pixel data representation at a resolution less than the second nominal resolution.

16. The computer program product according to claim 15, wherein the first and second nominal resolutions are equivalent.

17. The computer program product according to claim 13, wherein the second contone pixel data representation at a resolution less than the second nominal resolution is generated by sub-sampling the second contone pixel data representation at the second nominal resolution.

18. The computer program product according to claim 17, wherein the sub-sampling includes one of (a) simple averaging over a sub-sample area, (b) weighted averaging over a sub-sampled area, (c) determining the median of pixel values in a sub-sampled area, (d) determining the minimum of pixel values in a sub-sampled area, (e) determining the maximum of pixel values in a sub-sampled area, and (f) decimation.

19. A printing apparatus comprising:
an image marking device including a plurality of colorants for marking an image on a media substrate; and
an image processing device, the image processing device configured to perform a method of generating a halftone data representation of an image for marking on the image marking device, the method comprising:

(a) generating a first contone pixel data representation of the image for a first color separation associated with the image marking device;
(b) generating a second contone pixel data representation of the image for a second color separation associated with the image output device;
(c) generating a halftone data representation of the image for the first color separation as a function of the first contone pixel data representation at a first resolution and the second contone pixel data representation at a second resolution less than the first resolution;
(d) generating a halftone data representation of the image for the second color separation; and
(e) rendering the image on the multicolor image output device using the halftone data representation of the image for the first color separation and the halftone data representation of the image for the second color separation.

20. The printing apparatus according to claim 19, wherein step (d) comprises:
generating the halftone data representation of the image for the second color separation as a function of the first contone pixel data representation at a third resolution and the second contone pixel data representation at a fourth resolution greater than the third resolution.

21. The printing apparatus according to claim 19, wherein step (a) generates the first contone pixel data representation at a first nominal resolution, step (b) generates the second contone pixel data representation at a second nominal resolution, and step (c) generates the halftone data representation of the image for the first color separation as a function of the first contone pixel data representation at the first nominal resolution and the second contone pixel data representation at a resolution less than the second nominal resolution.

22. The printing apparatus according to claim 19, wherein the second contone pixel data representation at a resolution less than the second nominal resolution is generated by sub-sampling the second contone pixel data representation at the second nominal resolution.

23. The printing apparatus according to claim 22, wherein the sub-sampling includes one of (a) simple averaging over a sub-sample area, (b) weighted averaging over a sub-sampled area, (c) determining the median of pixel values in a sub-sampled area, (d) determining the minimum of pixel values in a sub-sampled area, (e) determining the maximum of pixel values in a sub-sampled area, and (f) decimation.

* * * * *